United States Patent [19]

Arsoy

[11] 4,170,723
[45] Oct. 9, 1979

[54] VEHICLE PEDAL HARD BRAKING SWITCH

[76] Inventor: Funun M. Arsoy, Hatay Cad. No. 621/9, Izmir, Turkey

[21] Appl. No.: 787,146

[22] Filed: Apr. 13, 1977

[30] Foreign Application Priority Data

Apr. 15, 1976 [TR] Turkey .................................. 33752

[51] Int. Cl.² .......................... H01H 3/14; B60Q 1/44
[52] U.S. Cl. ................................. 200/61.89; 340/69; 340/71
[58] Field of Search ............... 200/61.86, 61.88, 61.89, 200/61.9, 61.91, 153 C; 340/69, 71

[56] References Cited

U.S. PATENT DOCUMENTS

| | | | |
|---|---|---|---|
| 1,321,254 | 11/1919 | Singer | 200/61.89 |
| 1,673,206 | 6/1928 | Safely | 200/61.89 |
| 1,924,248 | 8/1933 | Lewellen | 200/61.89 |
| 2,170,088 | 8/1939 | Murray et al. | 340/71 X |
| 2,339,910 | 1/1944 | Centrella | 200/61.89 |
| 3,115,559 | 12/1963 | Cass et al. | 200/61.89 |
| 3,219,775 | 11/1965 | Carpenter | 200/61.89 |
| 3,313,897 | 4/1967 | Gorsky | 200/61.89 |
| 3,404,246 | 10/1968 | Stimpson | 200/61.89 |
| 3,414,879 | 12/1968 | Holland | 200/61.89 X |
| 3,500,313 | 3/1970 | Nolte | 340/71 |
| 3,576,529 | 4/1971 | Garrison | 20/ |
| 3,766,342 | 10/1973 | Stadelmann | 200/61.89 |

Primary Examiner—James R. Scott
Attorney, Agent, or Firm—Cooper, Dunham, Clark, Griffin & Moran

[57] ABSTRACT

A device for signaling a hard braking of a motor vehicle utilizing an electrical switch for controlling the energization of a hard brake warning light which operates in conjunction with the conventional motor vehicle brake light. The switch is mounted so as to be actuated when the brake pedal of the motor vehicle is depressed by more than a predetermined amount. Actuation of the switch is by a bracket carried by the brake pedal and which includes an inclined surface thereon. The actuating lever of the switch includes a roller that rides upon the inclined surface.

2 Claims, 2 Drawing Figures

A—A

VEHICLE PEDAL HARD BRAKING SWITCH

BACKGROUND AND BRIEF DESCRIPTION OF THE INVENTION

This invention relates to the prevention of driving accidents. In particular, it provides a system for signaling the hard braking of a motor vehicle through conventional warning devices presently utilized in motor vehicles.

The conventional motor vehicle brake system signals the braking of the vehicle to a following motorist through the use of a red signal lamp which is energized as the brake pedal is depressed. This brake signal gives no information to the following motorist about the degree of braking of the motor vehicle, and hence it cannot be determined whether the vehicle ahead is undergoing a light or hard braking. The present invention utilizes the yellow turn direction signal lamps on a motor vehicle for providing an indication of a hard or abrupt braking of a motor vehicle. Since, in many cases, the yellow turn indicator signal requires a following motorist to halt his vehicle, the use of the yellow turn signal as an additional hard brake warning indicator is appropriate.

In accordance with the present invention, the conventional brake system is provided with an additional switch which is actuated by the brake pedal when a hard brake situation occurs and which energizes a hard brake warning light, which advantageously constitutes the conventional turn direction signal lamps. The additional switch is disposed so that the conventional red brake light first is energized, followed by the hard brake warning light indication. As the brake pedal is released, first the yellow indicators are extinguished, then the conventional red brake light. In this fashion, the yellow turn direction indicator lamps have, in addition to the turn signal indication function, the function of signaling a hard or abrupt braking of the motor vehicle. With this new system accidents should be prevented.

In a preferred embodiment of the invention, a switch actuating bracket is mounted on the conventional brake pedal and includes an inclined surface thereon, of which the inclination may be varied. The additional switch for energizing the hard brake warning lamps is mounted adjacent to the brake pedal, and includes an actuating arm that carries a roller which rides on the inclined surface. In this fashion, as the brake pedal is depressed by a relatively large amount, accompanying an abrupt or hard braking, this additional switch is actuated to energize the hard brake warning lights. Changing the inclination of the inclined surface varies the amount of brake pedal movement needed to actuate the additional switch.

The invention will be more completely understood by reference to the following detailed description.

DETAILED DESCRIPTION

Figure 1:
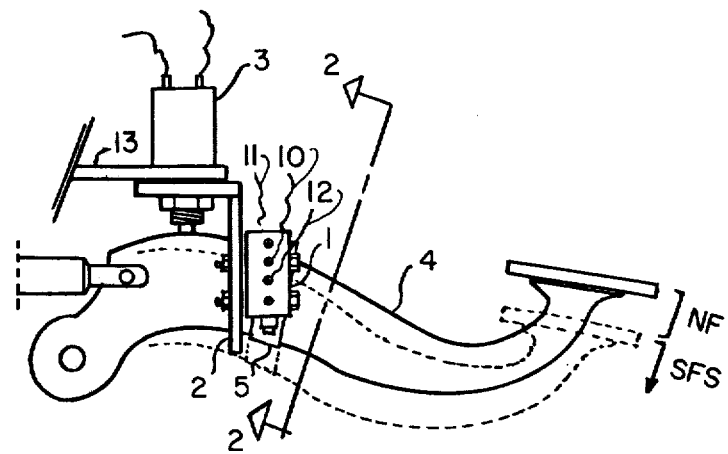
FIG. 1 is a side view of a system in accordance with the invention.

Referring to FIG. 1, a four-terminal contact arrangement 1 is provided that is carried by an L-shaped bracket 2. This bracket is advantageously fastened to chassis part 13 which carries conventional brake light switch 3 for controlling the energization of the conventional red brake signal lamps that are energized when brake pedal 4 is depressed.

Figure 2:
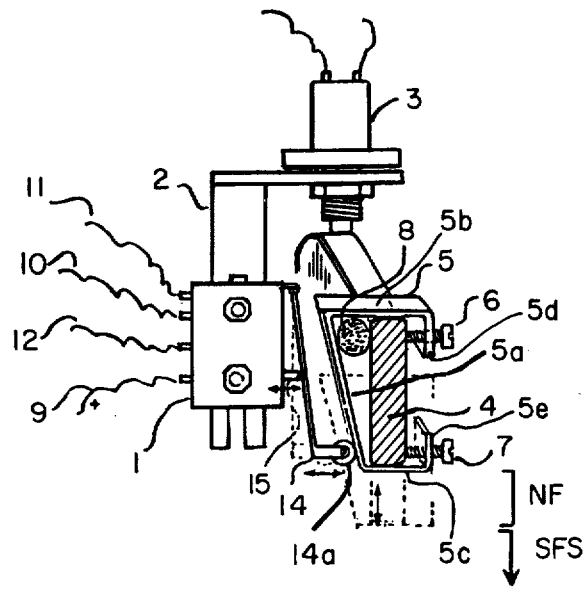
FIG. 2 is a view taken along the section 2—2 in FIG. 1.

Referring to both FIGS. 1 and 2, the brake pedal 4 has mounted thereon a bracket 5, having a first part 5b and a second part 5c that engage opposite edges of the brake pedal 4. The bracket 5 is secured in place by means of screws 6 and 7 passing through bracket parts 5d and 5e and resilient wedge member 8. The bracket 5 includes an inclined or sloping surface part 5a, the inclination of which may be adjusted by appropriate adjustment of screw 6.

The electrical switch contact arrangement 1 includes an actuating lever 14 carrying a roller 14a thereon that rides upon the inclined surface 5a of the bracket 5. The actuating lever actuates the contact arrangement 1 through switch element 15 so as to apply electrical energy from supply conductor 9 to output conductors 10, 11 and 12. The conductors 10 and 11 may be connected to the yellow turn signal indicator lamps of the motor vehicle, while the conductor 12 may be conducted to a dashboard lamp located on the instrument panel of the vehicle.

When the brake pedal 4 is operated by no more than a normal amount (NF), the conventional red signal brake lamp is energized by the conventional brake light switch 3. When the brake pedal 4 is operated by more than this normal amount (SFS), indicating a hard brake incident, the roller 14a riding on the inclined surface 5a causes the switch actuating element 15 to complete the circuits within the switch arrangement 1 to provide power from the supply conductor 9 to the output conductors 10, 11 and 12. Thus current is conducted through the conductors 10 and 11 to energize the yellow indicator lamps, to indicate a hard braking of the motor vehicle. At the same time, energizing the conductor 12 causes the dashboard lamp to be energized, providing an indication to the driver that the warning system is operational.

It is thus apparent that, as the brake pedal is depressed to a hard brake condition, the conventional red brake warning light is first energized (through the switch 3), followed by energization of the hard brake warning lights (switch 1 and conductors 10 and 11). As the brake pedal 4 is returned to the non-braking position, the conductors 10 and 11 are first deenergized, first deenergizing the yellow signal lamps, followed by deenergization of the conventional red brake signal lamps by switch 3. It will be noted that changing the inclination of the surface 5a, by suitable adjustment of screw 6, varies the amount of movement of brake pedal 4 needed to actuate the switch 1 and energize the hard brake warning lights.

It is apparent that the preferred embodiment described above is subject to modification. Accordingly, the invention should be taken to be defined by the following claims.

I claim:

1. In a device for signaling a hard braking of a motor vehicle including electrical switch means for controlling the energization of a hard brake warning light which operates in conjunction with the conventional motor vehicle brake light, actuating means for actuating said electrical switch means, and mounting means for mounting said electrical switch means and said actuating means in operative relationship to the brake pedal of said motor vehicle so as to provide for actuation of said electrical switch means to energize said hard brake warning light when said brake pedal has been depressed by more than a predetermined amount, and said electrical switch means includes an actuating lever, the improvement wherein said actuating means comprises a bracket including mounting means for mounting said bracket on said brake pedal and having an inclined surface thereon adapted to bear against said actuating lever to actuate said switch means upon movement of said brake pedal greater than a predetermined amount, said bracket including means for varying the inclination of said inclined surface thereby to vary the amount of brake pedal movement needed to actuate said switch means.

2. A device according to claim 1, wherein said bracket includes first and second parts adapted to engage opposite edges of said brake pedal, a third part constituting said inclined surface and joining together said first and second parts and adapted to be positioned adjacent one side of said brake pedal, a resilient wedge member adapted to be positioned between said third bracket part and said one side of said brake pedal, said bracket including fourth and fifth parts adapted to be positioned adjacent a side of said brake pedal opposite from said first side, and screw means passing through at least one of said fourth and fifth parts and adapted to be positioned against said opposite side of said brake pedal to maintain said bracket in place on said brake pedal, said screw means being adjustable to provide for said variation in the inclination of said inclined surface.

* * * * *